June 3, 1941.   L. DELIVUK   2,243,840
DISTRIBUTOR SPOUT MECHANISM
Filed March 20, 1939   3 Sheets-Sheet 1
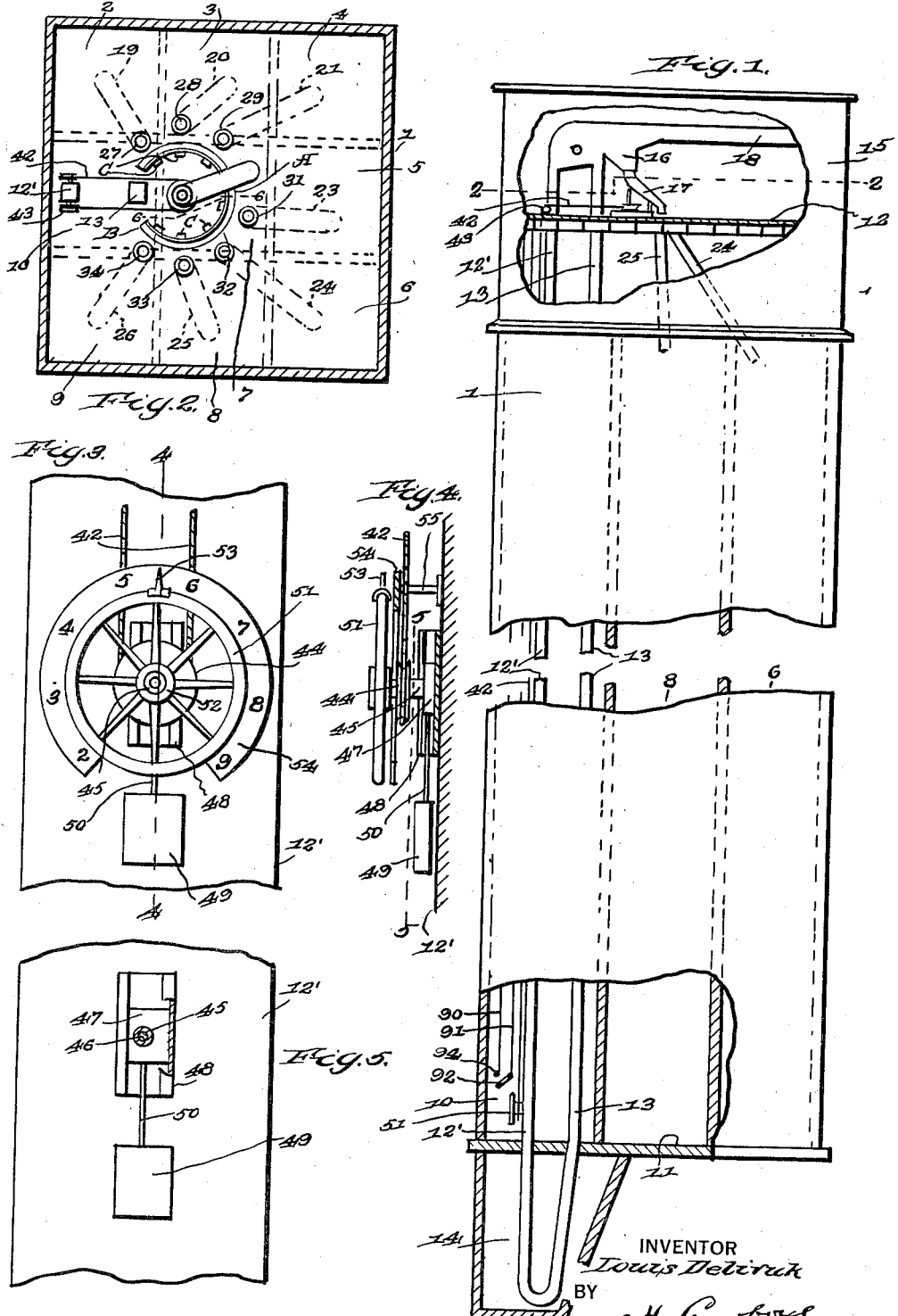

June 3, 1941.					L. DELIVUK					2,243,840
DISTRIBUTOR SPOUT MECHANISM
Filed March 20, 1939					3 Sheets-Sheet 2
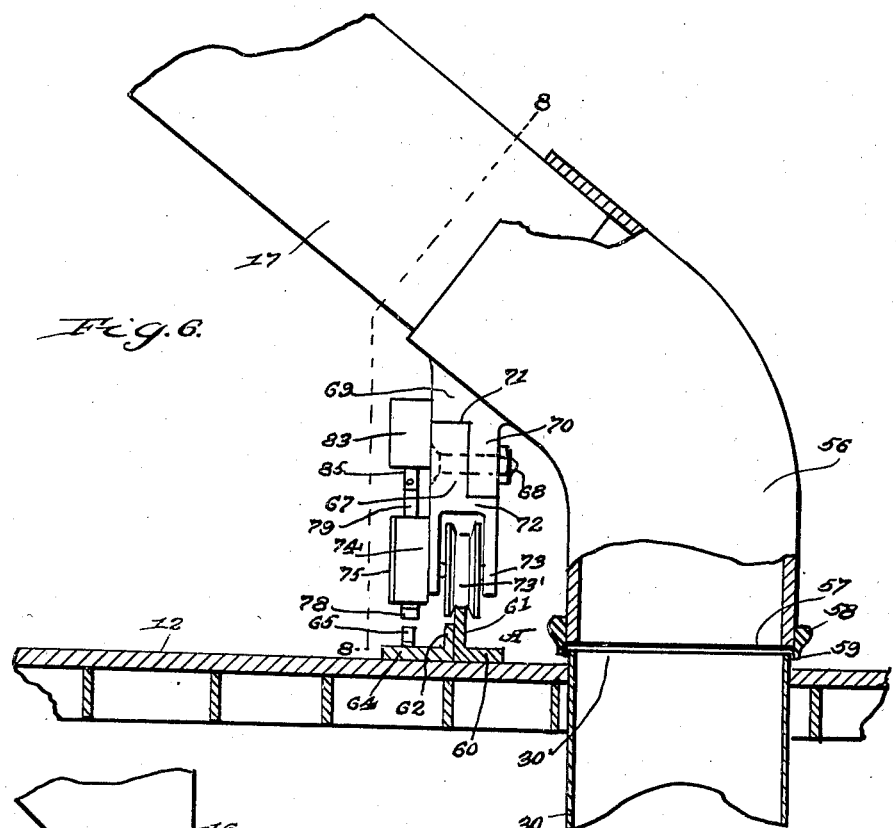
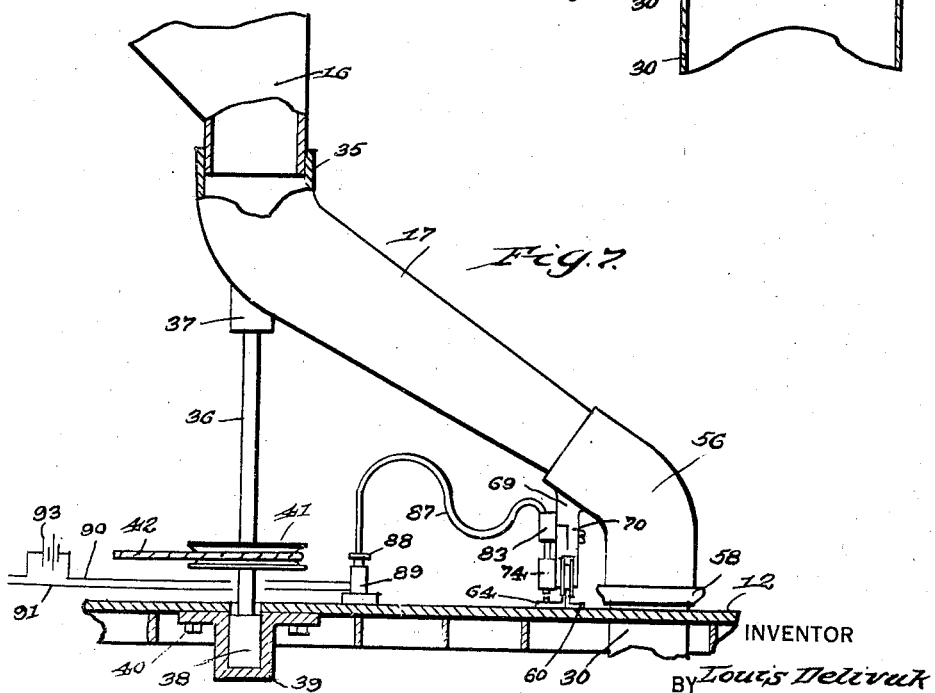
INVENTOR
Louis Delivuk
BY Carl H. Crawford
ATTORNEY

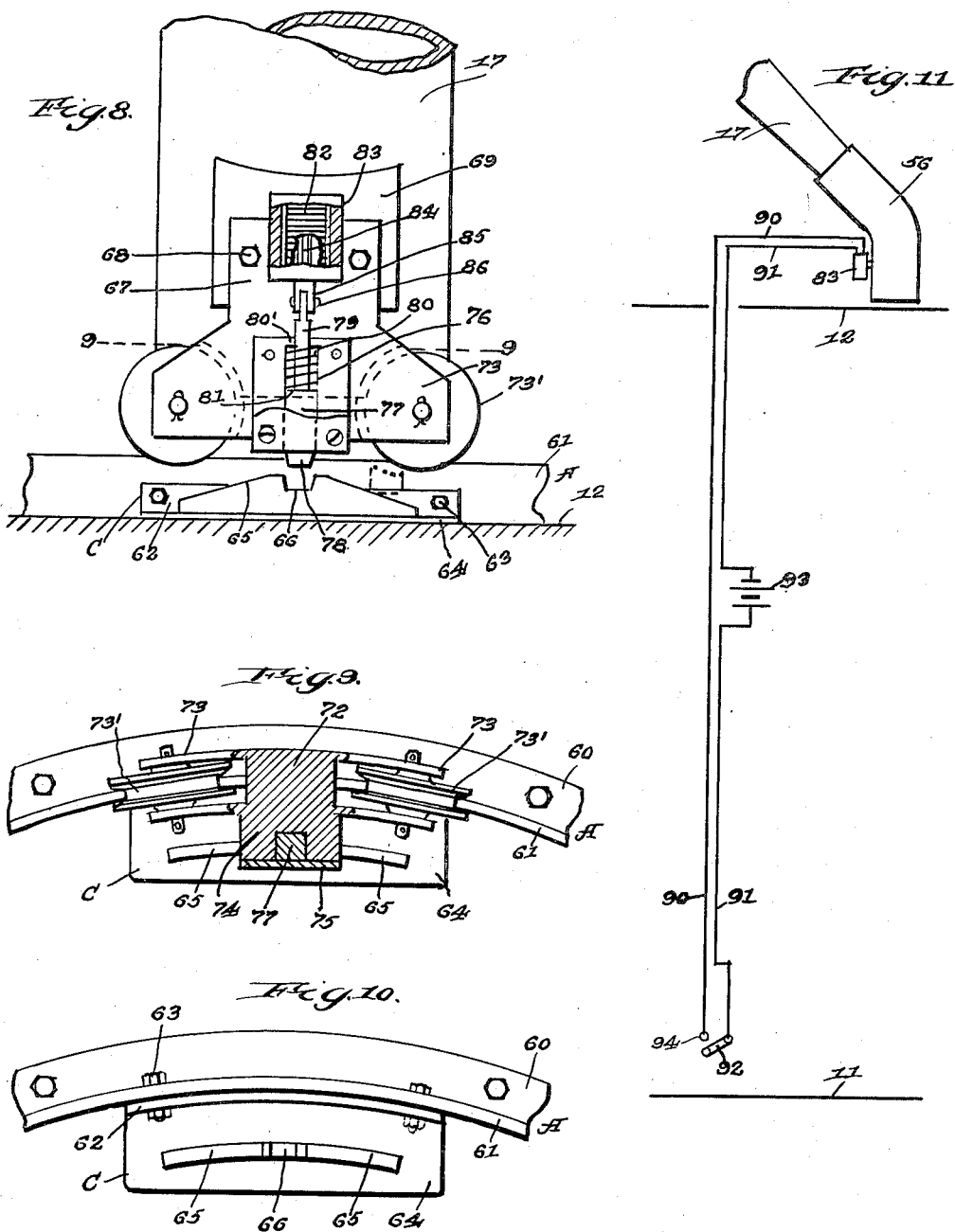

Patented June 3, 1941

2,243,840

UNITED STATES PATENT OFFICE 2,243,840

DISTRIBUTOR SPOUT MECHANISM

Louis Delivuk, Spokane, Wash.

Application March 20, 1939, Serial No. 262,922

8 Claims. (Cl. 193—23)

This invention relates to improvements in remote control mechanism for the distributor spouts of grain elevators.

The usual form of a grain elevator consists broadly in a plurality of grain bins with a lower work floor, an upper distributor floor and a distributor spout mounted to be advanced into selective positions to deliver grain into the ingress ends of the usual grain pipes that convey the grain to the several bins. The means for controlling the distributor spout has always been located in a position accessible to the operator on the work floor, and of course the operator thus located is in a remote position below the distributor floor and cannot see the action of the parts he manipulates. Further, indexing wheels, in cable connection with the spout often become inaccurate due to cable slack and settling of the structure and other causes, and considerable time is wasted when it becomes necessary for the operator on the work floor to ascend to the distributor floor to inspect the spout mechanism and make adjustments to correct inaccurate operation. Lack of registry of the distributor spout with the grain pipes causes losses and wastes that cannot be observed from the work floor.

These, and many other defects of the present systems which it is unnecessary to detail, constitute the motive for the improvements which comprise my invention. Among my objects, it is a feature of the invention to restrict the spout advancing means, whether cable-indexed or not, to the mere function of advancing the distributor spout into or toward an estimated position of registering delivery relation to the selected grain pipe, and to provide means whereby an accurate and positive delivering registry may be insured and maintained irrespective of any inaccuracy of the advancing means.

A distributor spout is seldom advanced consecutively into delivery registry with successively disposed grain pipes in any order of uniformity, but on the contrary it is advanced in either of two opposite directions, from delivery relation with one pipe, to a like relation with a pipe remote from the pipe it was last registered with, and then back again to intermediately disposed pipes, and therefore it is the object of this invention to arrest and maintain the spout in accurate delivery registry with any one of the grain pipes, irrespective of the range of selectivity employed by the operator. And, in the most improved form of the invention this registry is performed automatically.

A further feature of the invention resides in an improved means whereby the delivery end of the distributor spout is automatically connected with the grain pipe, when brought into registering delivery therewith, in such a manner as to prevent dust from escaping into the super-structure above the distributor floor, in which the distributor spout mechanism is housed.

In present constructions the distributor spout is structurally centered to be rotated about a fixed axis and is sustained by a main or major support in such centered position. Now it is an object of my invention to provide the delivery end of the distributor spout with a minor support which will maintain the delivery end in a uniformly horizontal position thereby avoiding the tilting action heretofore necessary in order to make a connection with the previously required funnel ends of the grain pipes, all of which is avoided by the improvements of which the present invention consists.

The invention has other objects and features which will be more fully described in connection with the accompanying drawings and which will be more particularly pointed out in and by the appended claims.

In the drawings:

Fig. 1 is a view in side elevation of a grain elevator with parts broken away to show interior parts.

Fig. 2 is a sectional view on line 2—2 of Fig. 1.

Fig. 3 is a face view of an index wheel means operable from the work floor.

Fig. 4 is a sectional view on line 4—4 of Fig. 3.

Fig. 5 is a sectional view on line 5—5 of Fig. 4.

Fig. 6 is a sectional view on line 6—6 of Fig. 2, showing the discharge end of the distributor spout and its accompanying parts on an enlarged scale.

Fig. 7 is a similar view showing the spout throughout its length together with accompanying parts.

Fig. 8 is a sectional view on line 8—8 of Fig. 6.

Fig. 9 is a sectional view on line 9—9 of Fig. 8.

Fig. 10 is a plan view of a section of the track.

Fig. 11 is a diagrammatic view of the circuit for operating a solenoid.

Like characters of reference designate similar parts throughout the different figures of the drawings.

With reference to the drawings, I will first describe a usual elevator structure, and while I have herein, and also in the claims, referred to a grain elevator, it will be understood that the device of my invention is equally adapted to elevators of like character wherein coffee, rice and similar material is handled, hence, I do not wish to be limited to grain elevators.

Referring very generally to Figs. 1 to 5, an elevator is shown and generally designated at 1, the same having grain or like bins 2 to 9, and what is called a machinery well 10. The elevator has a lower work floor 11, and an upper distributor floor 12, which, as will now be clear, are remotely separated by the height of the elevator which of course varies in accordance with the capacity thereof. Extending lengthwise of the machinery well 10 are the up and down legs 12' and 13, respectively, of the usual elevator mechanism which need not be described in detail and which has a suitable intake in a wheat receiving pit 14. The legs 12' and 13 extend upwardly in well 10, and into the spout house 15, wherein the endless conveyer (not shown) in the legs 12' and 13 dumps the grain into a head hopper 16 that discharges into a distributing spout generally indicated at 17, and which will later be described more in detail. A chute 18 carries the dust from the hopper 16.

A grain delivery or bin pipe is provided for each bin and said pipes are designated at 19 to 26 and said pipes have ingress ends 27 to 34, opening through the distributor floor 12, as shown in Figs. 6 and 7, and said ingress ends are arranged in a definite order which, as shown, is in a circular formation about the axis of rotation of spout 17. Thus, spout 17 can be moved or rotatively advanced into registered delivery relation to any one of said ingress ends 27 to 34.

As will be seen by reference to Fig. 7, the upper or intake end 35 of spout 17 is structurally pivoted or centered to rotate about a fixed vertical axis by being sleeved or telescoped about hopper to provide a permanent dust proof connection 16. A main or major support for said spout 17 usually consists of a rod 36, which may be suitably fixed in a boss 37, secured to spout 17 at its upper end, the lower end 38 being socketed in a bearing 39 secured to the distributor floor 12, as at 40. A sheave 41 is fixed to rod 36, and a cable 42 is trained about, and if desired anchored to said sheave, the limbs of said cable extending over pulleys 43 (Figs. 1 and 2) and down the machinery well 10, and about a sheave 44 fixed to a sleeve 45. Sleeve 45 is rotatable on a stub shaft 46, mounted on a sliding block 47 that is slidable in a guide 48, mounted on any stationary part such as the upleg 12'. A weight 49, connected with said block by a cable 50, normally acts to maintain cable 42 under tension.

Means, which may be an indexed means, is employed, as shown, for operating said cable 42, and may consist of a manually operable index wheel 51 having a hub 52 fixedly mounted on said sleeve 45, and having an index finger 53. An arcuate index strip 54 is fixedly mounted at 55 on leg 12', and has index numbers 2 to 9, corresponding to the numbers of bins 2 to 9, or eight in number.

The foregoing is a usual construction of grain elevator except that the spout 17, as shown, is not tiltable to lower its discharge end toward or into the ingress end of a grain pipe, but on the contrary rotates in dustproof engagement about a fixed vertical axis, of which the axis of rod 36 is the center, and the substantially horizontally disposed discharge end of spout 17 is maintained in a substantially horizontal position, as will later appear.

While I have shown the cable 42, and index wheel 51 as the indexed means for actuating or advancing spout 17, I do not wish to be limited thereto, as any suitable remote control means for performing this function would be within the scope of my invention.

Reference will next be made to what more particularly constitutes the subject matter of this invention, and I will refer to Figs. 6 to 10.

The discharge end of spout 17 is preferably in the form of an elbow and is formed of rather heavy material such as cast iron and is indicated at 56, and this end outwardly telescopes the tapered end of the angularly disposed or inclined main body of the spout 17, and is made of heavy material because of the wear imposed by the grain. The extreme terminal or downwardly facing discharge end 57 is disposed slightly above the distributor floor 12, and because of a minor support which I shall presently describe, this extreme terminal is always maintained in a horizontal plane of movement and the horizontal position of the extreme end 57 therefore never changes from the position shown in Fig. 6. Thus, I avoid the tilting movement of spout 17 that has been heretofore necessary in order to make delivery connection with the grain pipes. Because the spout need not be tilted, I thereby avoid making it in telescoping sections and am able to make the spout 17 wholly inextensible and non-contractible throughout its length.

The ingress ends of all the grain pipes 19 to 26, instead of being flared or having funnel ingress ends, are, on the contrary, of the normal diameter of the main bodies of the pipes, and are also of substantially the same internal diameter as the spout 17, thereby effecting a material saving in construction, and as all are identical in form and function, only one need be described in detail. Thus, it will be seen that grain pipe 30, which delivers to bin 7, and as shown in Fig. 6, extends slightly above the level of floor 12 to form an ingress end 30'.

I will next describe a novel means whereby the extreme terminal 57 of spout 17 may automatically make a substantially dustproof connection with an ingress end 30', when brought into registry therewith, and how such connection is automatically dis-established when said spout is advanced out of registry with said ingress end.

Said feature is embodied in a flexible coupling which may be applied to either pipe entity, but which I preferably apply to the discharge end 56 of the spout. As shown, said coupling consists of a ring of flexible material, such as rubber, as indicated at 58, the upper portion, as shown, being rather thick and the lower projecting or depending flange 59 being of substantially reduced thickness to increase its flexibility. Said flange 59, as shown, projects slightly below the terminal 57, and the spacing of the latter from the top of end 30' permits said flange 59 to flex inwardly throughout its advancing peripheral portion, as the spout approaches a position of registry with said ingress end, and finally assumes the telescoping relationship shown in Fig. 6, as will now be clear. While I do not pretend that this is an absolute dustproof fit, it is sufficiently so that only a minor portion of dust will escape into the spout house. It will now be clear how the flexible coupling is automatically disconnected when the spout moves out of registry with the ingress end. I am therefore able to provide a spout which at all times turns about a vertical axis, without any tilting movement, and at the same time I make an effective dust proof connection with each ingress end of each grain pipe.

Reference will next be made to what I will term a minor support for the spout 17, and to additional functions which this minor supporting mechanism performs.

This mechanism involves a track that is shaped to correspond with the disposition of the ingress openings, which, in the present construction, is a circular formation, and as shown in Fig. 2, the track, which is generally indicated at A, has a radius struck from the axis of rotation of spout 17, or in other words, the axis of rod 36, in Fig. 7. The ends B of track A terminate short of a complete circle and the downleg 13 is interposed between the ends B.

Referring now to a more detailed showing of the track A, and particularly to Figs. 6 to 10, it will be seen that the track is of angle formation in cross section, one part 60 being suitably fixed to floor 12, and the other part or flange 61 forming the actual rail of the track. It will also be noted that the track is disposed inside the discharge end of spout 17 so that the latter overhangs and extends radially beyond the track thereby leaving the discharge end 56 free to register with the ingress ends of the grain pipes.

Said track is provided with one element of a series of registering devices C, equal in number to the number of ingress ends, and said devices also act to arrest and retain the spout 17 in a registering position with a selected ingress end, and as all of said devices are identical in form and function, only one need be described in detail.

Said elements of said devices, as shown, are disposed radially inwardly of the track, and are preferably attached thereto, and as shown in Figs. 8 to 10, said element includes an angle having an upright flange 62 secured to rail 61, as by means of bolts 63, and a horizontal flange 64, which rests on floor 12 and which need not be secured thereto unless it is found desirable. On flange 64 is secured a rail having oppositely disposed inclines or inclined portions 65 which function as cams, and an intermediate recess 66, which performs the function of a register element or keeper. These parts are so disposed that if a radial line were drawn from the axis of rotation of spout 17, through the axis of rod 36, and intersecting the axis of an ingress end, such as 30', then such line would pass through the center of the recess or keeper 66. Thus a keeper is associated or provided for each ingress end and in radial alinement therewith.

Reference will next be made to a means which includes an element that coacts with the keeper element to arrest and retain the spout in a position of registry with an ingress end, and I will now refer to Figs. 6, 8 and 9.

A part of this means includes a minor support for the spout 17, which especially functions to sustain the heavy discharge elbow 56 at a uniform elevation above the distributor floor 12, and this part of said means is in the form of undercarriage which includes a frame having an anchoring portion 67 adapted to be secured by means such as bolts 68 to a depending lug 69, which may be formed integral with the cast iron discharge end 56. Said lug 69 has a flange 70 that forms a shouldered offset 71, whereby the anchoring portion 67 will have a structural connection with lug 69, when bolted thereto, to reduce the stress on bolts 68. The frame includes a central portion 72 from which forked journals 73 extend in opposite directions. Flanged carriage wheels 73' are rotatively mounted in said forked journals and are adapted to traverse the rail 61, as will now be clear.

A guide 74 may be cast on or attached to the carriage frame and may be provided with a removable side 75. This guide has a guideway 76 in which a latch member or bolt 77 is guided and held to a vertical path of movement, and in its normal retracted position, the lower end 78 of said bolt may project slightly below said guide. Said bolt 77 is shown reduced at its upper end as at 79, and to insure its descent in said guide I may interpose an expansively acting spring 80 between part 80' and the shoulder 81, which will normally act to shift said bolt 77 downwardly toward and into the keeper 66, if in practice the action of gravity is not sufficient. When bolt 77 is lowered to its extreme position, as shown by dotted lines in Fig. 8 (engaging the right hand cam 65), it will engage one of the shifting cams 65, riding up the same, until it reaches notch or keeper 66, whereupon it will quickly descend thereinto and arrest and lock the carriage against pivotal movement and in a position of rest, thereby forming a delivery point register mechanism.

Any suitable remote control means may be provided for retracting said bolt and holding it retracted in the full line position shown in Fig. 8, against the action of spring 80. Except when it is in engagement with a keeper, it is necessary to retract the bolt 77 and maintain it retracted to avoid engagement with successive keepers beyond which it may be desired to advance the spout.

One means shown, and which is especially adapted for this function, because of the necessity of remote control, is of an electrical form and may consist of a solenoid 82, mounted in a casing 83, secured to the carriage frame, and having an armature 84 which is movable up and down in the winding, as will be clearly understood. The lower end of the core or armature is enlarged to form a fork 85, not only to limit upward movement of the core but also to afford a pivotal connection 86 with bolt end 79.

Because the spout 17 never completes a circular movement, I find it convenient to connect the solenoid to one end of an electrical cord 87, with sufficient slack to accommodate movement of spout 17, the remaining end being connected with a plug 88 to a convenient socket 89, or one conveniently located. In order to illustrate a circuit, leads 90 and 91 extend from said socket down the machinery well 10 to a suitably placed switch 92, a source of current being indicated at 93. In Fig. 11 I have shown the complete circuit in diagrammatic form, the solenoid being indicated at 83 on spout 17, with distributor floor shown at 12, and the work floor below at 11. The switch 92 is shown in an open circuit position and can be closed by engagement with the terminal 94. However, many changes may be made in the electrical wiring without departing from the invention, and, broadly considered, I claim a remote control for the bolt 77, for the general function as now defined.

While the operation of my invention may be clear from the foregoing, it will be briefly recapitulated as follows:

With spout 17, in the Figs. 2, 6 and 7 position, delivering to ingress end 30', the switch 92 would be open and the bolt 77 would be down and in engagement with the keeper in radial relation to ingress end 30'. After making this delivery, and assuming that the operator desired to shift the spout 17 to ingress end 27, for instance, he would first adjust switch 92 into a circuit closing position and this would energize solenoid 82, and retract or lift bolt 77 out of engagement with the keeper, and of course the switch would remain closed in order to free the lower end of bolt 77 from the keeper devices located between ingress end 30' and ingress end 27. Otherwise spring 80 would force bolt 77 down again. With the spout 17 now free the operator would grasp index wheel 51 and turn the same contraclockwise, viewing Fig. 3, until the index 53 registered with number 2 on the dial 54. Slightly before the index 53 reached dial number 2, the operator would know that the bolt 77 has passed over the keeper of ingress end 28, and therefore he would open switch 92 to free bolt 77 so that spring 80 could force said bolt downwardly. Hence, the bolt would first engage the cam 65 that it was approaching and would ride up on the same until it reached the keeper, whereupon it would be shot downwardly into engagement with the keeper thereby arresting and retaining the spout in absolute registry with ingress end 27.

At this point it is desired to emphasize the fact that the operator on the work floor 11 cannot possibly see the movement of spout 17, and therefore he will be, in the strictest sense, operating the latter by remote control. Irrespective of the take-up device shown in Figs. 3 to 5, which takes up cable slack as a result of settling of a frame elevator or for other causes, there is always a certain degree of inaccuracy that develops in such a cable indexing means. Hence, it was heretofore necessary to flare the ingress ends of the grain pipes, in addition to tilting the spout, to lower the discharge end into engagement with the flared or funnel intake ends of the grain pipes, to make allowance for such inaccuracy.

However, with my present arresting and retaining devices, it will be clear that a very considerable inaccuracy could develop in the cable indexing means, an inaccuracy of many inches in fact, and still the operator could safely open the circuit after the index member 53 had passed dial number 3, knowing full well that the released bolt 77 would first engage the nearest cam 65 and finally coact with the keeper 66 of ingress-end 27, and arrest and retain the spout in registry therewith, even though index member 53 had not yet reached, or had even gone beyond dial number 2. In fact, the engagement of bolt 77 with the keeper of the selected device, could readily be "felt" by the operator since this engagement alone, and by itself, would prevent any further movement of the spout 17 by wheel 51, in either of two opposite directions.

Since movement of spout 17 is seldom moved consecutively from one ingress end to another, in any fixed order, but is in the vast majority of instances moved selectively back and forth to variously located ingress ends, it will now be clear why it is important to provide bolt engaging cam tracks 65, extending in opposite directions from the centrally disposed keeper, except perhaps at the terminal ends B.

It will now be clear how the flexible coupling 56 will successively and automatically connect itself with and from each ingress end as the spout is advanced in either direction, but as the spout is moved slowly, the coupling will merely flex over the ingress ends of pipes over which it does not stop. While I regard this flexible coupling, or its equivalent, as a very advantageous feature, it will be understood that the device of my invention would be clearly and effectively operable in the absence of this feature.

It will also be clear that a wide variety of flexible couplings could be used because the rapidly descending grain in spout 17 would itself act to inflate an even less resilient coupling than that shown, or in fact even a non-resilient but flexible coupling, because the grain is in such volume, and because of the gradually reduced diameter of the spout.

It is important to note the fact that in addition to carrying the bolt 77, and its operating mechanism, the carriage also functions in an important capacity of maintaining the extreme terminal 57 thereof in a fixed horizontal plane of travel, thereby making it possible to employ a coupling that can be automatically connected with the ingress ends.

Because of the fact that the spout 17 is angularly disposed to the vertical and has only its upper intake end structurally centered and structurally supported, the weight mass is always out of balance and therefore if it were not for the supporting function performed by my carriage at the discharge end, the overbalance of weight would impose an objectionable torsion on the parts which structurally center the spout.

As the index wheel and cable advancing means is old, it is important to note that any means for advancing the spout in opposite directions would be within the scope of this invention if the operator on the work floor had any means of indicating the position of the spout, hence, an indicating means which is also an advancing means is not essential to my invention.

It will now be clear that I have disclosed mechanism which specifically involves the bolt 77 and keeper 66 for arresting and retaining the spout in registering positions with ingress ends, together with means for rendering said mechanism effective, as by releasing said bolt, or rendering said mechanism ineffective, as by retracting said bolt.

It is believed that the track and carriage mechanism shown and described is novel as an article of equipment, and I have claimed it as such.

Because of the velocity which the grain attains by the time it reached the elbow 56, I have purposely made the latter of relatively heavy and durable material, as previously stated, and it will be seen that this construction permits me to mount the carriage 67, the bolt 77 and guide 74 and the solenoid casing 83, containing the solenoid, in fixed relation to this elbow 56. Thus, I provide a self-contained assemblage which not only avoids the requirement of any connection with support 36, but which, in addition, constitutes an accessory that can readily be applied to an old distributor spout having the usual mounting at its ingress end. With this accessory, it will be understood that the track would also be necessary in the specific form shown.

It will also be clear that by disposing the track A, radially inwardly of the elbow 56, so that the latter overhangs the track, that I am not only able to mount the track directly upon the distributor floor, without elevating the track, and I can dispose and connect the carriage with the elbow in subjacent relation thereto whereby I obtain a most advantageous mechanical efficiency in the supporting relation and greatly facilitate the connection of the solenoid by a flexible connection 87, with a plug and socket arrangement.

While I have herein shown and described one specific form of the invention, I do not wish to be limited thereto except for such limitations as the claims may import.

I claim:

1. In an elevator structure of the class described, a distributor floor and a plurality of bin pipes provided with ingress ends of the same diameter as said pipes and arranged in a circular order and projecting above the level of said floor and occupying a single horizontal plane, a distributor spout mounted to rotate about a fixed axis coincident with the center from which said circularly arranged ingress ends are disposed and said spout having a downwardly facing horizontally disposed discharge end disposed substantially parallel with the plane occupied by said ingress ends and of substantially the same internal diameter as any one of said ingress ends, means for supporting said discharge end at a fixed level of travel and in clearance relation to said ingress ends, means for advancing said spout to dispose said discharge end into direct delivery registry with a selected ingress end, and a flexible annular coupling mounted on said discharge end and having a flange depending below the plane occupied by said ingress ends and the clearance of said discharge end being sufficient to permit said depending flange to be automatically flexed into surrounding dustproof connection with an ingress end as said discharge end is advanced into registry therewith and flexed out of such connection as said discharge end is advanced away from said ingress end.

2. In an elevator structure of the class described, a distributor floor and a bin pipe provided with an ingress end member projecting above said floor, a distributor spout having a downwardly facing discharge end member in substantially parallel clearance relation with said ingress end member, means for advancing said discharge end member into and out of registry with said ingress end member along a fixed level of travel, and a flexible annular coupling mounted on one of said members and having a projecting flange and the clearance relation between said discharge end member and said ingress end member being sufficient to permit said projecting flange to be automatically flexed into telescopic dustproof connection as said discharge end member is advanced into registry with said ingress end member and flexed out of such connection as said discharge end member is advanced away from said ingress end member.

3. In an elevator structure of the class described, a distributor floor and a plurality of bin pipes provided with ingress ends extending through said floor and arranged in a circular order and occupying the same horizontal plane, a circular track on said floor inside said ingress ends and having a number of bolt keepers corresponding to the number of said ingress ends, a distributor spout centered to swing about an axis of rotation and having a self-contained elbow assemblage comprising a heavy durable discharge elbow for said spout provided with a downwardly facing horizontally disposed discharge end overhanging said track for selective registry with said ingress ends, said assemblage including a supporting carriage fixed to said elbow and having wheels running on said track to support said discharge end in fixed clearance relation to said ingress ends, a bolt guide fixed to said carriage, a bolt slidable in said guide for engaging said keepers to lock said discharge end in registry with a selected ingress end, a solenoid mounted on said carriage and operatively connected with said bolt, an electric circuit including a source of current and a remotely located controlling switch, said circuit having a flexible connection with said solenoid extending inside of said track to permit movement of said solenoid with said spout, and means for advancing said spout toward a selected ingress end.

4. In an elevator structure of the class described, a distributor floor and a plurality of bin pipes provided with ingress ends extending through said floor and arranged in circular order and occupying the same plane, a circular track on said floor disposed radially inward from said ingress ends and having a number of keepers corresponding to the number of said ingress ends, a distributor spout centered to swing about an axis of rotation and having a self-contained assemblage including a heavy durable elbow for said spout and said elbow having a downwardly facing discharge end for selective registry with said ingress ends and overhanging said track, said assemblage including a carriage fixed to said elbow and having wheels running on said track to support said discharge end in fixed clearance relation to said ingress ends, a bolt slidable on said carriage for coaction with said keepers to lock said spout in registry with selected ingress ends, electrical means mounted on said carriage for actuating said bolt and having a remotely located controlling switch, and means for advancing said spout toward selected ingress ends.

5. In an elevator structure of the class described, a distributor floor and a plurality of bin pipes provided with ingress ends extending through said floor and arranged in circular order and occupying the same plane, a circular track directly mounted on said floor radially inwardly from said ingress ends and having a number of registering elements corresponding to the number of ingress ends, a distributor spout centered to swing about an axis of rotation and having a self-contained elbow assemblage including an elbow forming an extension of said spout and having a downwardly facing discharge end disposed radially outwardly of said track for selective registry with said ingress ends, said assemblage including a carriage fixed to said elbow and having wheels running on said track to support said discharge end in fixed clearance relation to said ingress ends, a locking member on said carriage coacting with said registering elements to lock said spout in a registering position with a selected ingress end, electrical means on said carriage for actuating said locking member, remotely located means for controlling said electrical means, and means for advancing said spout.

6. In a distributor spout section and track carriage mechanism for elevator equipment of the class described, a track of circular form having registering elements, an elbow of heavy durable material overhanging said track and adapted to form the discharge end of a distributor spout, a carriage having wheels running on said track and being rigidly secured to a subjacent portion of said elbow substantially directly above said track to support said elbow at a fixed level of travel, and mechanism mounted on said carriage and coacting with said registering elements for arresting and retaining said carriage at definite points along said track.

7. In a distributor spout and track mechanism for an elevator having a circular row of storage bin ingress openings substantially horizontally disposed, a circular track disposed concentrically inside said circular row of ingress openings and having a stationary registering element associated with each of said openings, a rotating spout inclined from the vertical and having an elbow at its lower end overhanging said track and provided with a substantially horizontally disposed discharge end and said spout being in-extensible and non-contractible throughout its length, means supporting the upper end of said spout and restricting said spout to horizontal movement about a substantially fixed vertical axis, a carriage having wheels running on said track and being rigidly secured to a subjacent portion of said elbow substantially directly above said track to support said elbow with its discharge end at a fixed level of travel relative to and close to said ingress openings, and mechanism mounted on said carriage and having a movable element coacting with said stationary registering elements for arresting and retaining said carriage at definite points along said track to register said discharge end of said spout with selected ingress openings.

8. In a grain spout mechanism of the type employing an inclined pivoted delivery spout having an under carriage for supporting the outer end of said spout for positioning in register with one of a series of storage bin ingress openings; a delivery point register mechanism comprising a downwardly urged latch member adapted to travel with the under carriage and spout end, remotely controllable means for raising and releasing said latch member, and a register element associated with each storage bin ingress opening and cooperable with the latch member to register the delivery spout with the associated ingress opening, said register element having a notch engageable by the latch member to lock the delivery spout and carriage against pivotal movement, said register element also having opposed cam faces operable to raise the latch member against its downward urgence during pivotal movement of the delivery spout.

LOUIS DELIVUK.